(12) United States Patent
Barton et al.

(10) Patent No.: US 11,878,811 B2
(45) Date of Patent: Jan. 23, 2024

(54) EXTERNALLY ACCESSIBLE AUXILIARY POWER UNIT PUMP ASSEMBLY

(71) Applicants: Randy L. Barton, Fremont, NE (US); Tracy L. Ogle, Fremont, NE (US)

(72) Inventors: Randy L. Barton, Fremont, NE (US); Tracy L. Ogle, Fremont, NE (US)

( * ) Notice: Subject to any disclaimer, the term of this patent is extended or adjusted under 35 U.S.C. 154(b) by 9 days.

(21) Appl. No.: 18/145,622

(22) Filed: Dec. 22, 2022

(65) Prior Publication Data
US 2023/0406532 A1    Dec. 21, 2023

Related U.S. Application Data

(60) Provisional application No. 63/292,773, filed on Dec. 22, 2021.

(51) Int. Cl.
*B64D 41/00*      (2006.01)
*B64C 27/04*      (2006.01)

(52) U.S. Cl.
CPC .............. *B64D 41/00* (2013.01); *B64C 27/04* (2013.01); *B64D 2041/002* (2013.01)

(58) Field of Classification Search
CPC .... B64D 41/00; B64D 2041/002; B64C 27/04
See application file for complete search history.

(56) References Cited

U.S. PATENT DOCUMENTS

2021/0310412 A1*  10/2021  Williams .................. F02C 7/20

* cited by examiner

*Primary Examiner* — Valentina Xavier
(74) *Attorney, Agent, or Firm* — Nasr Patent Law LLC; Faisal K. Abou-Nasr

(57) ABSTRACT

Aspects of this disclosure relate to externally accessible auxiliary power unit (APU) pump assembly, comprising: a pump configured to pressurize an accumulator that is used to start an APU of an aircraft; a pressure gauge for the accumulator; and a support frame configured to be mounted within an outer wall of the aircraft, wherein the support frame defines an externally accessible compartment and secures the pump and the pressure gauge within the externally accessible compartment.

20 Claims, 11 Drawing Sheets

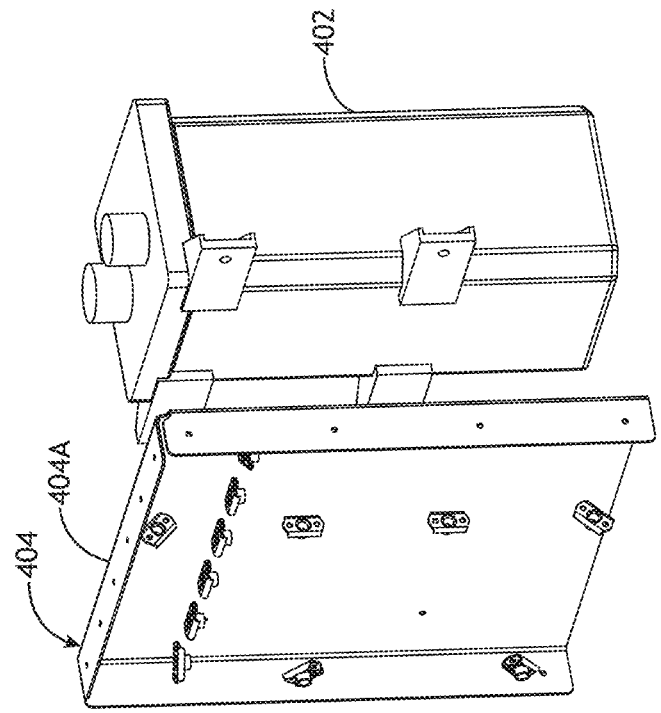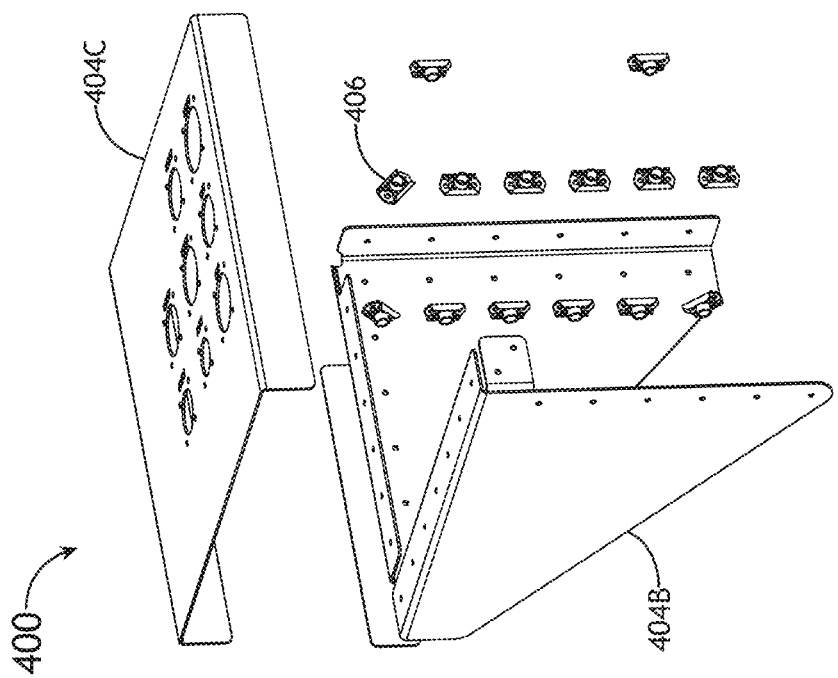
FIG.8

EXTERNALLY ACCESSIBLE AUXILIARY POWER UNIT PUMP ASSEMBLY

CROSS-REFERENCE TO RELATED APPLICATIONS

The present application claims priority under 35 U.S.C. § 119(e) to U.S. Provisional Application Ser. No. 63/292,773, filed Dec. 22, 2021, and titled "EXTERNAL AUXILIARY POWER UNIT SERVICE PORT," which is incorporated herein by reference in its entirety.

TECHNICAL FIELD

The present disclosure relates to auxiliary power unit (APU) and electronic sequence unit (ESU) assemblies and associated structures for helicopters and possibly other aircrafts.

BACKGROUND

Many helicopters and other aircrafts include an auxiliary power unit (APU), a secondary source of power that is typically used when the main engine fails or as a redundant ignition system. The process for starting the APU may require manually providing pneumatic/hydraulic pressure to an accumulator by means of a hand-actuated pump until the accumulator is sufficiently pressurized to start the APU.

The pump, accumulator, and other APU components are usually located above the main cabin of an aircraft. As a result, it is difficult to access the APU pump if the aircraft includes a finished ceiling, and possibly other components built into the ceiling such as HVAC systems, lighting systems, and so forth. The ceiling, in-ceiling systems, and other portions of the main cabin interior may be damaged while removing parts in order to access the APU pump, and the process of removing parts to access the APU pump can also result in delays that potentially put passengers at risk of harm in critical situations.

To overcome limitations of existing APU systems, it is necessary to make the APU pump and other serviceable components easier to access.

SUMMARY

Aspects of this disclosure generally relate to an externally accessible auxiliary power unit (APU) pump assembly, comprising: a pump configured to pressurize an accumulator that is used to start an APU of an aircraft; a pressure gauge for the accumulator; and a support frame configured to be mounted within an outer wall of the aircraft, wherein the support frame defines an externally accessible compartment and secures the pump and the pressure gauge within the externally accessible compartment. In some embodiments, the externally accessible compartment also houses a removable pump handle that is used to actuate the pump.

The externally accessible APU pump assembly is part of a system for externally providing pneumatic/hydraulic pressure for the APU of the aircraft, wherein the APU accumulator may be located in the ceiling of the aircraft above the main cabin. The system can provide external access to the pump and pressure gauge via the externally accessible compartment defined by the support frame. The support frame may be mounted within the outer wall of the aircraft at a rear portion of the aircraft behind the main cabin. This configuration allows for access to the APU pump without needing to remove any ceiling structures in the main cabin, hence providing easier and faster access to the APU pump and also reducing risk of damage to interior furnishings or structural components in the main cabin.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is provided with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 8 is an exploded view of the ESU assembly, in accordance with an example embodiment of this disclosure.

DETAILED DESCRIPTION

Reference will now be made in detail to the subject matter disclosed, which is illustrated in the accompanying drawings.

Figure 1:
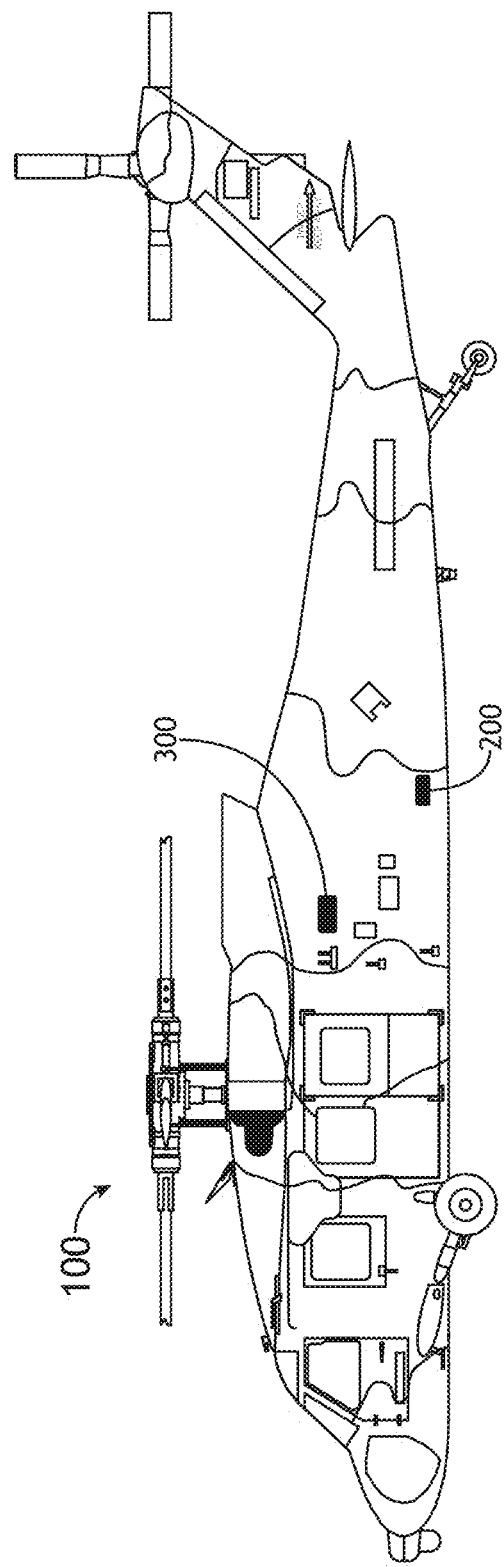
FIG. 1 illustrates an aircraft with an externally accessible auxiliary power unit (APU) pump assembly, in accordance with an example embodiment of this disclosure.

FIGS. 1 through 12 illustrate embodiments of a system including an externally accessible auxiliary power unit (APU) pump assembly, wherein the pump and other serviceable components of an APU for an aircraft (e.g., helicopter) are mounted within an externally accessible compartment in the outer wall of the aircraft. For example, FIG. 1 illustrates an aircraft 100 with an externally accessible APU pump assembly 200, in accordance with an embodiment of this disclosure.

Although the aircraft in FIG. 1 is a helicopter, it is contemplated that the externally accessible APU pump assembly 200 can be installed in any other aircraft or vehicle wherein the pump and other serviceable components of the APU would otherwise be obstructed by ceiling/wall structures, other systems, and/or custom modifications. This system configuration also allows passengers to be seated within the aircraft while a technician services the APU.

Figure 2:
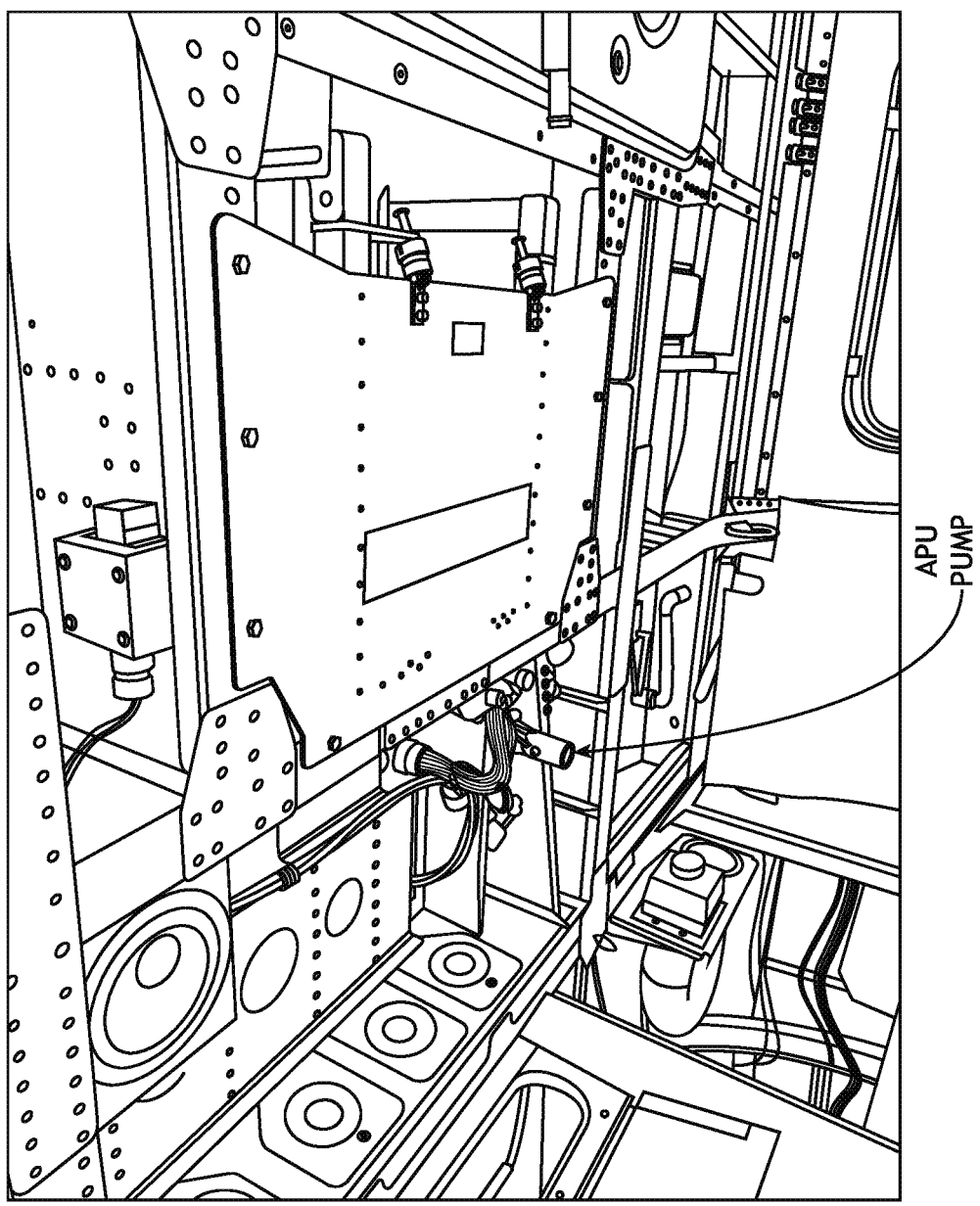
FIG. 2 is a perspective view showing an example of the APU pump placement in existing systems.

FIG. 2 is a perspective view showing an example of the APU pump placement in existing systems. The pump, accumulator, and other APU components are usually located above the main cabin of an aircraft. As a result, it is difficult to access the APU pump particularly if the aircraft includes a finished ceiling, and possibly other components built into the ceiling such as HVAC systems, lighting systems, and so forth. The ceiling, in-ceiling systems, and other portions of the main cabin interior may be damaged while removing parts in order to access the APU pump, and the process of removing parts to access the APU pump can also result in delays that potentially put passengers at risk of harm in critical situations.

The above-mentioned problems that affect existing systems, such as the example system shown in FIG. 2, are eliminated or significantly mitigated by the APU pump assembly 200 and system disclosed herein.

Figure 3:
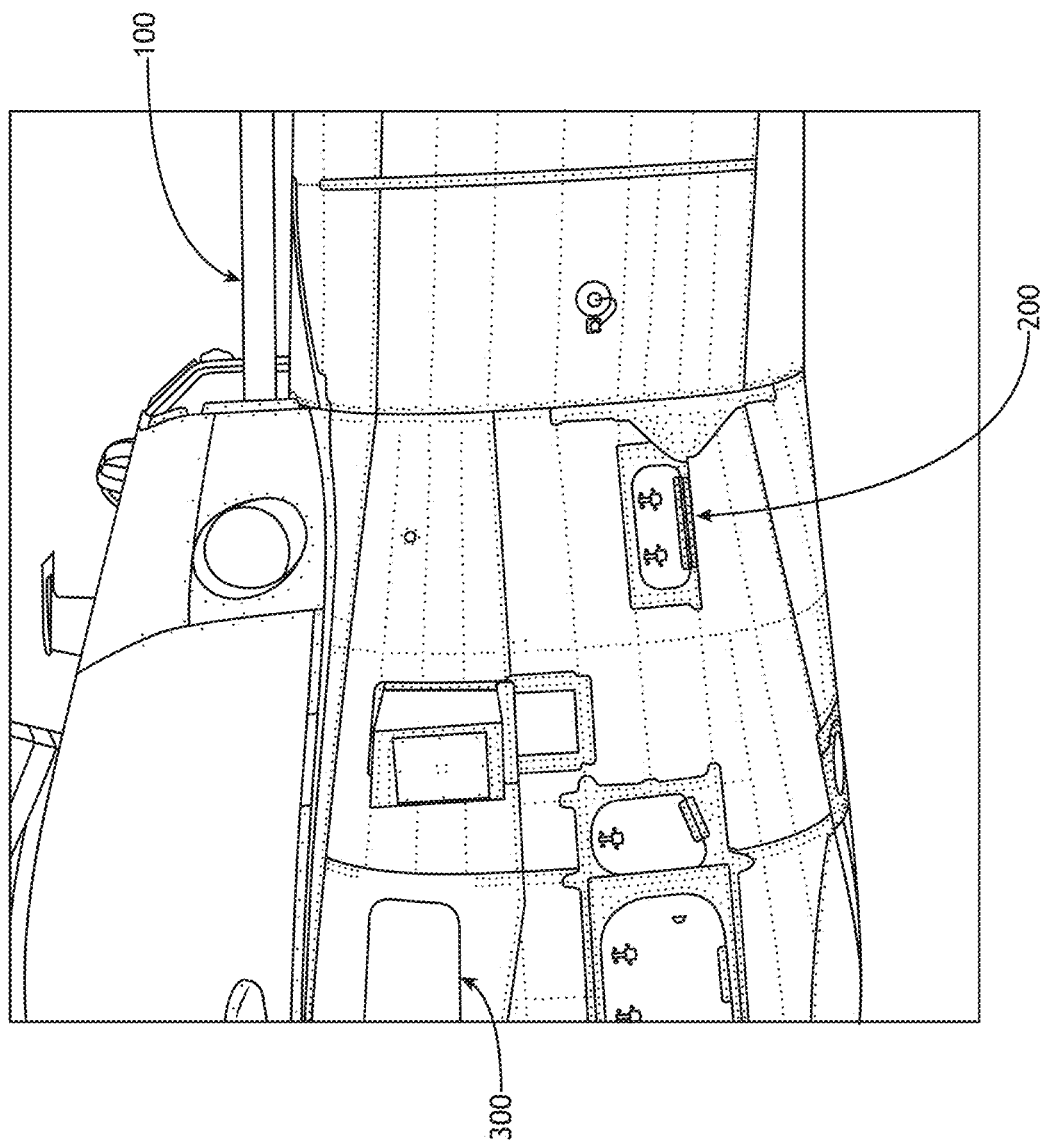
FIG. 3 is a perspective view of a rear portion of the aircraft with the externally accessible APU pump assembly, in accordance with an example embodiment of this disclosure.
Figure 4:
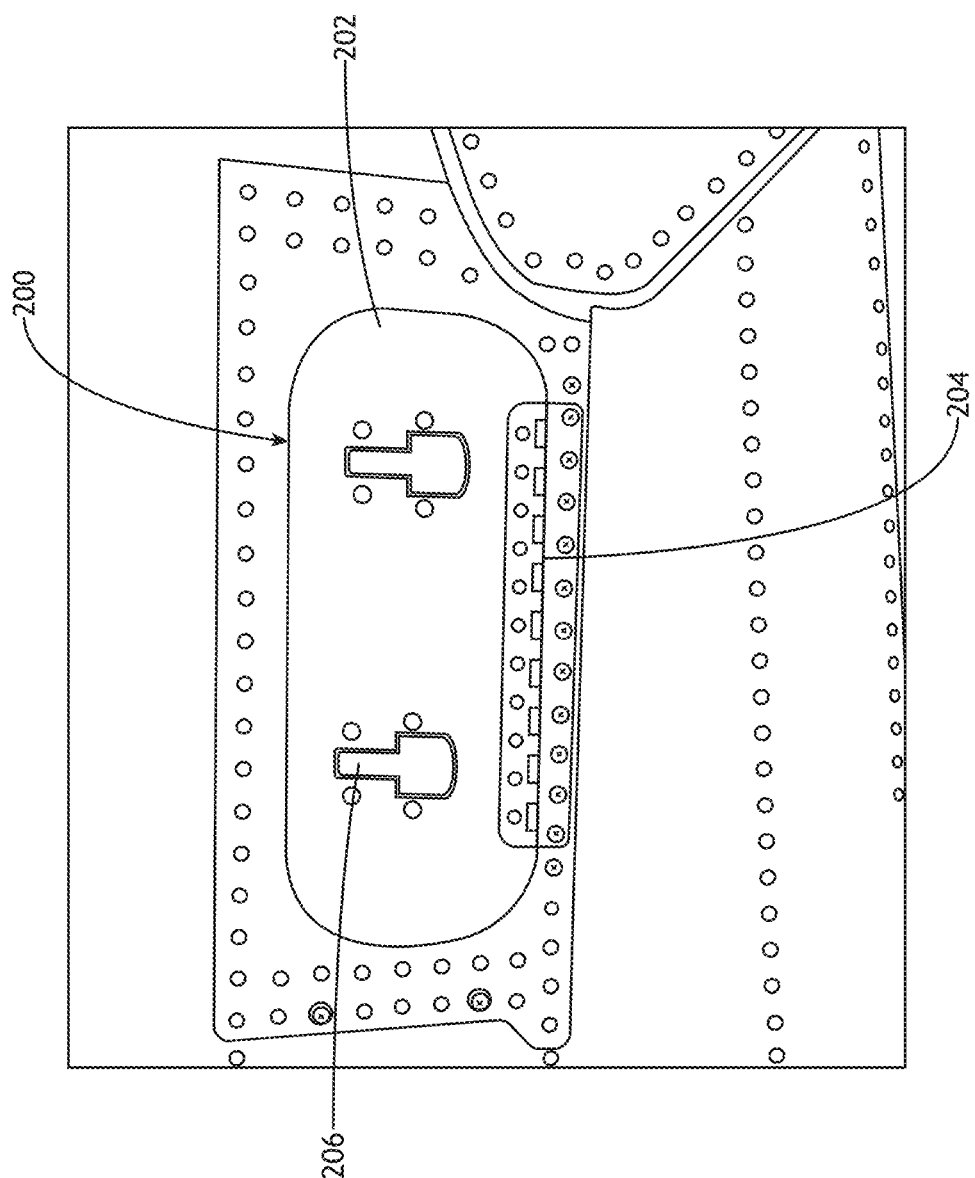
FIG. 4 is a perspective view of the externally accessible APU pump assembly, wherein a cover panel for the externally accessible APU pump assembly is in a latched configuration, in accordance with an example embodiment of this disclosure.
Figure 5:
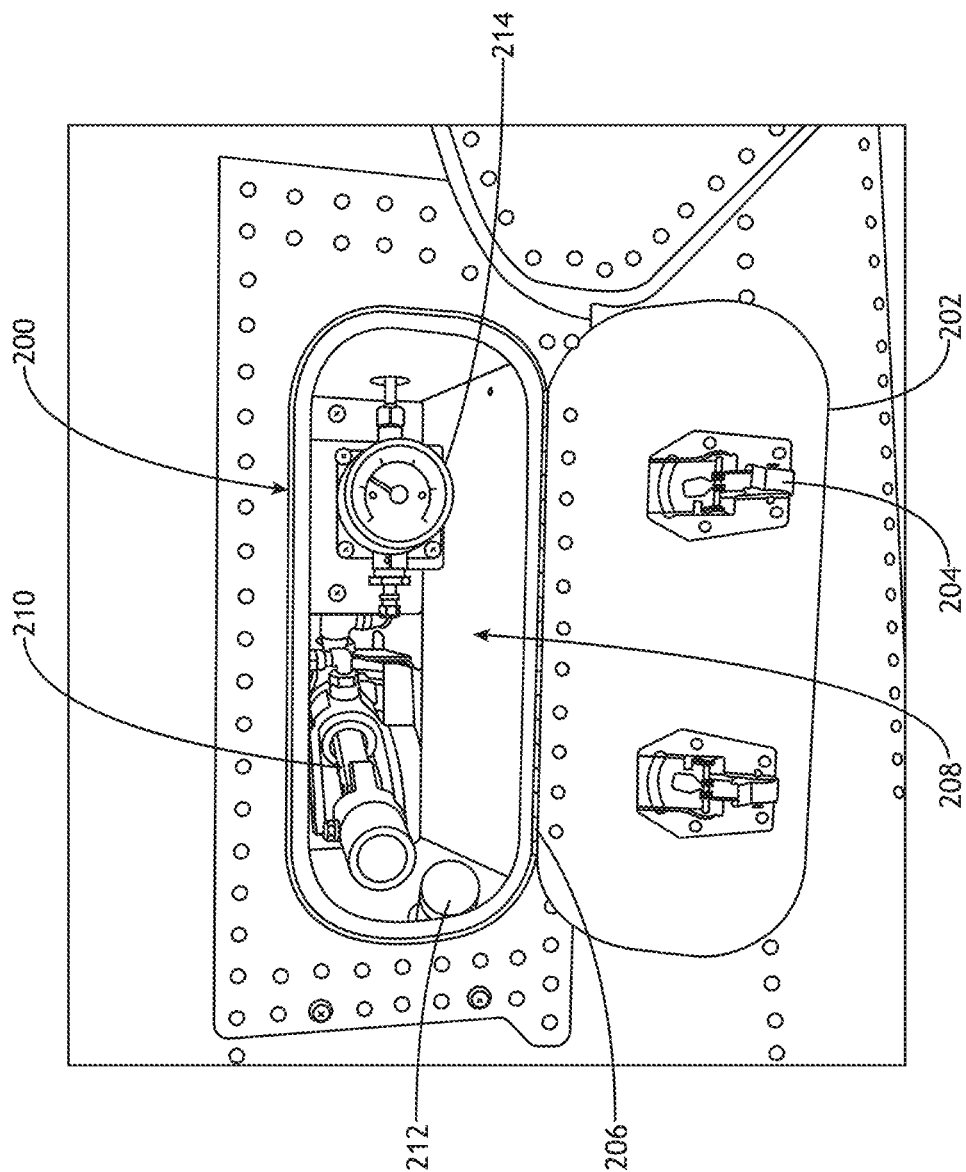
FIG. 5 is a perspective view of the externally accessible APU pump assembly, wherein a cover panel for the externally accessible APU pump assembly is in an unlatched configuration, in accordance with an example embodiment of this disclosure.

As shown in FIGS. 3 through 5, the presently disclosed APU pump assembly 200 and system configuration relocates the APU pump 210 and other serviceable components of the APU (e.g., pressure gauge 214) to an externally accessible compartment. This relocation provides easy access for ground maintenance crew to service and repair components for the APU start system, reducing mission down time and increasing operation readiness. The APU pump relocation also facilitates unrestricted cabin modifications, including but not limited to, HVAC systems, lighting systems, internal fuel tank installation, command/control consoles, volcano mine dispensation systems, as well as custom modifications.

FIG. 3 is a perspective view of a rear portion of the aircraft 100 with the externally accessible APU pump assembly 200 located behind the main cabin of the aircraft 100, in accordance with an example embodiment of this disclosure.

Referring now to FIGS. 4 and 5, the APU pump assembly 200 may be equipped with a cover panel 202 that closes off the APU pump assembly 200 from outside the aircraft 100 when the cover panel 202 is secured (e.g., latched or fastened) and allows access to APU pump assembly components (e.g., pump 210, pressure gauge 214, etc.) when the cover panel 202 is removed or swung open. In some embodiments, the cover panel 202 is coupled to the outer wall of the aircraft 100 by one or more hinges 206 so that the cover panel 202 can be swung between open and closed positions. For easy access, the cover panel 202 may be securable by one or more latches 204 (e.g., two latches shown in FIG. 5). In alternative embodiments, the cover panel 202 may be fully removable by unlatching or unfastening the cover panel 202 and taking it off to access serviceable components of the APU pump assembly 200.

As shown in FIG. 5, the APU pump assembly 200 includes a support frame 208 configured to be mounted within an outer wall of the aircraft 100. The support frame 208 may comprise a metal casing that defines an externally accessible compartment within the outer wall of the aircraft 100. The metal casing may be formed from sheet metal or any other sufficiently rigid and durable material. In this regard, the support frame 208 is not necessarily a "metal" casing in all embodiments. In addition to providing structure for the outwardly facing cavity that defines the externally accessible compartment, the support frame 208 also secures the pump 210, pressure gauge 214, and possibly other serviceable components of the APU pump assembly 200 within the externally accessible compartment.

Figure 10:
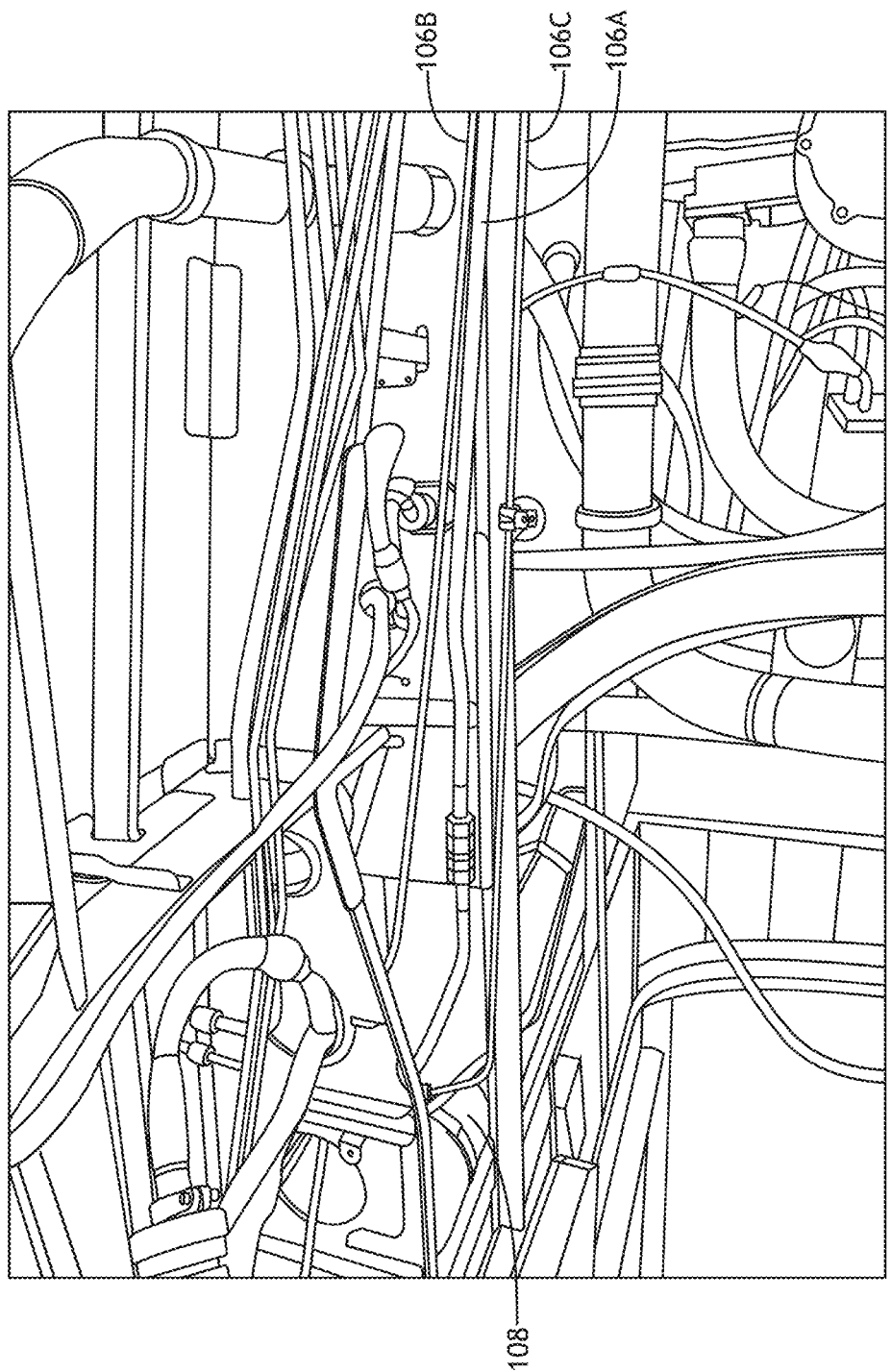
FIG. 10 is a perspective view of an internal portion of the aircraft in front of the internal rear portion of the aircraft illustrated in FIG. 9, wherein the plurality of pipes/hoses from the APU pump assembly are shown extending to an accumulator of an APU system for the aircraft, in accordance with an example embodiment of this disclosure.

The pump 210 is configured to pressurize an accumulator 108 (see accumulator 108 in FIG. 10). The accumulator 108 is used to start the aircraft's APU with energy in the form of stored pneumatic/hydraulic pressure. The pump 210 is preferably a hand-actuated pneumatic/hydraulic pump; however, other types of pumps can also be used (e.g., an electromechanically actuated pump, a foot-actuated pump, etc.). In some embodiments, such as the embodiment shown in FIG. 5, the externally accessible compartment also houses a removable pump handle 212 that is used to actuate the pump 210. The pump handle 212 may also be secured by the support frame 208.

Figure 9:
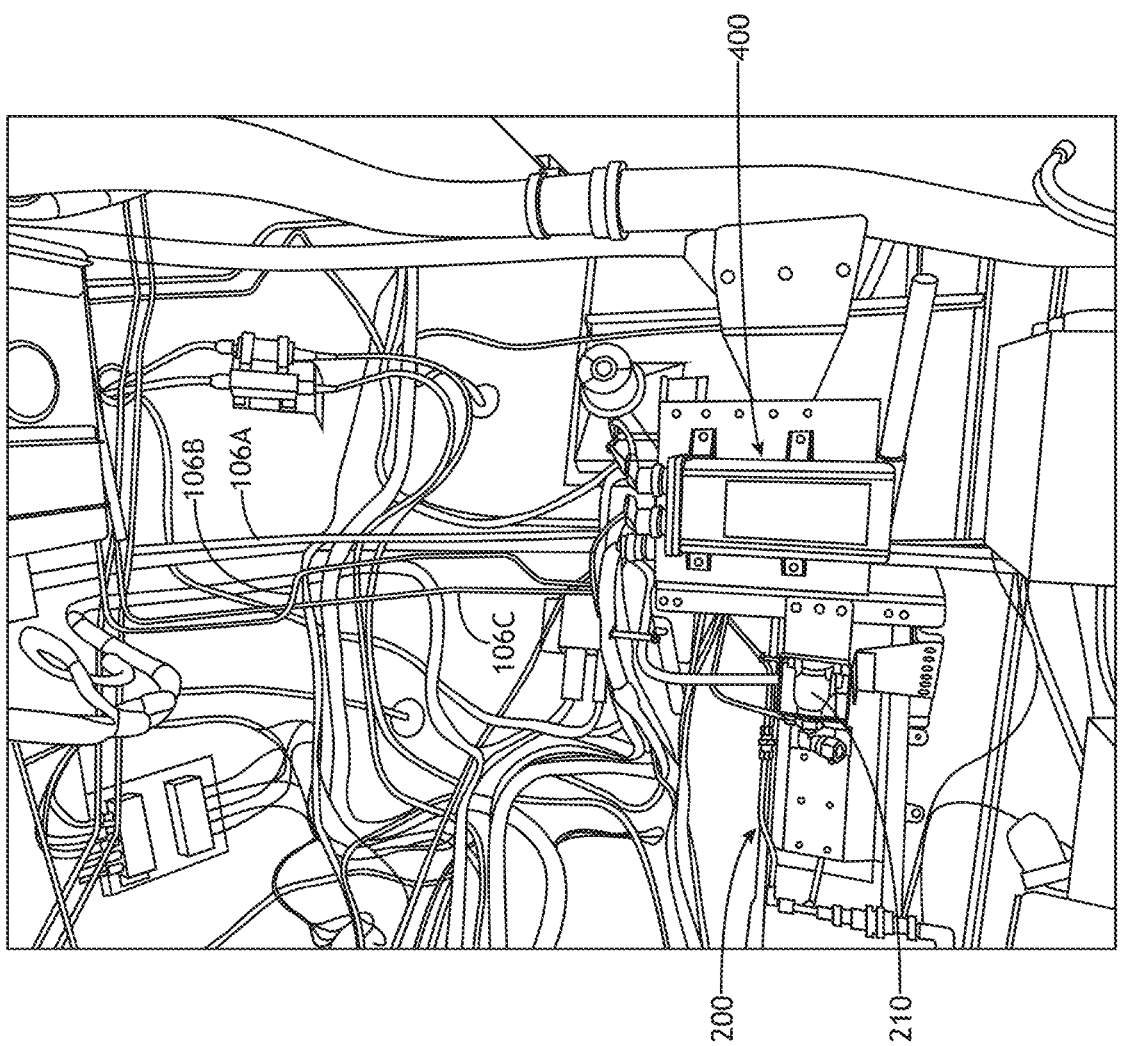
FIG. 9 is a perspective view of an internal rear portion of the aircraft with the externally accessible APU pump assembly, wherein a plurality of pipes/hoses are shown extending forward in the aircraft from the APU pump assembly, in accordance with an example embodiment of this disclosure.

The pump 210 and the pressure gauge 214 are both fluidically coupled to the accumulator 108 by tubing (see hoses/pipes 106A-106C in FIGS. 9 and 10). Accordingly, the pressure gauge 214 is configured to display the internal pressure of the accumulator 108.

In an example use scenario, a technician may access the APU pump assembly 200 and use the pump 210 to pressurize the accumulator 108 until the pressure gauge 214 displays a sufficient pressure (i.e., a predetermined activation pressure) for starting the APU. Once the activation pressure is reached, a crewmember inside the aircraft 100 will attempt to start the APU.

In embodiments, the accumulator 108 may be located within the ceiling of the aircraft 100 above the main cabin near the APU. Nevertheless, the system provides external access to the pump 210 and pressure gauge 214 via the externally accessible compartment defined by the support frame 208, which is preferably mounted within the outer wall of the aircraft 100 at a rear portion of the aircraft 100 behind the main cabin. This configuration allows for access to the APU pump 210 without needing to remove any ceiling structures in the main cabin, hence providing easier and faster access to the pump 210 and also reducing risk of damage to interior furnishings or structural components in the main cabin.

Figure 6:
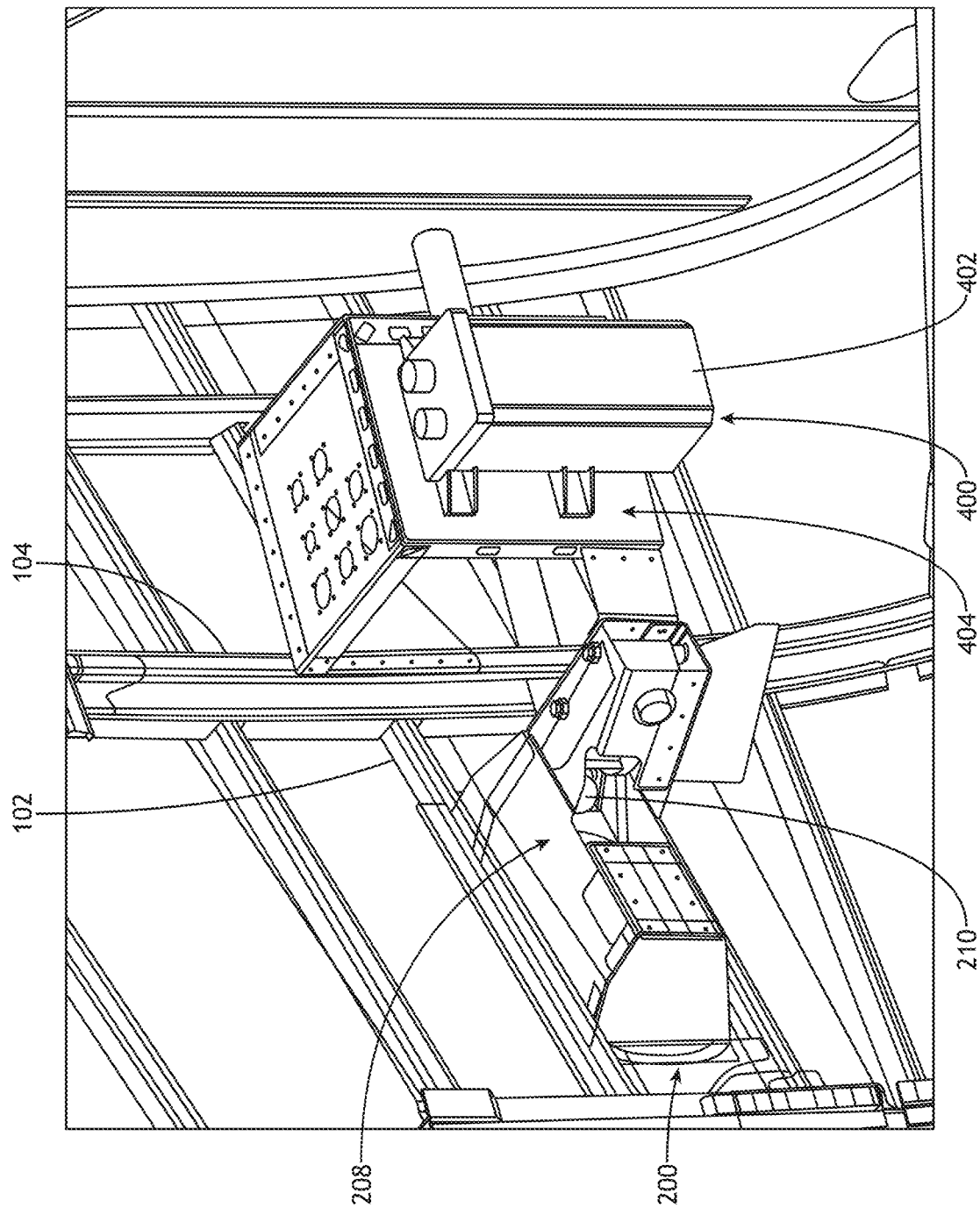
FIG. 6 is a perspective view of an internal rear portion of the aircraft with the externally accessible APU pump assembly, wherein the rear portion of the aircraft also contains an electronic sequence unit (ESU) assembly, in accordance with an example embodiment of this disclosure.

FIG. 6 is an internal view of the rear portion of the aircraft 100 behind main cabin. In embodiments, the APU pump assembly 200 is mounted between at least two horizontal beams 102 and/or vertical beams 104 that reinforce the outer wall of the aircraft 100. For example, the support frame 208 may be mounted between horizontal beams 102 and/or vertical beams 104 of the outer wall at the rear portion of the aircraft 100 behind the main cabin.

In embodiments, the rear portion of the aircraft 100 also contains an electronic sequence unit (ESU) assembly 400. The ESU assembly 400 may also be mounted to the outer wall at the rear portion of the aircraft 100 behind the main cabin. For example, the ESU assembly 400 may be located on the inside of the aircraft 100 adjacent to the support frame 208 of the APU pump assembly 200 that defines the externally accessible compartment. The ESU assembly 400 includes an ESU 402 that controls automatic start sequencing, running, and other aspects of APU operation. The ESU 402 may be mounted to a bracket 404 between at least two horizontal beams 102 and/or vertical beams 104 of the outer wall at the rear portion of the aircraft 100 behind the main cabin. In some embodiments, the ESU bracket 404 is mounted between the next set of beams after the mounting location of the APU pump assembly 200. In preferred embodiments, the opposite wall of the aircraft 100 (across from the APU pump assembly 200 and the ESU assembly 400) includes an access door/panel to provide the access to the ESU assembly 400 and portions of the APU pump assembly 200 (or connections thereto) that cannot be reached via the externally accessible compartment.

As shown in FIG. 8, the ESU bracket 404 may comprise a vertical panel 404A that defines a mounting surface for the ESU 402, a horizontal panel 404C configured to be mounted to the horizontal beams 102 and/or vertical beams 104 of the outer wall of the aircraft 100, and a supportive wedge 404B coupled between the vertical panel 404A and the horizontal panel 404C. All of bracket components may be held together by a plurality of fasteners (e.g., bolts, rivets, screws, etc.).

Figure 7:
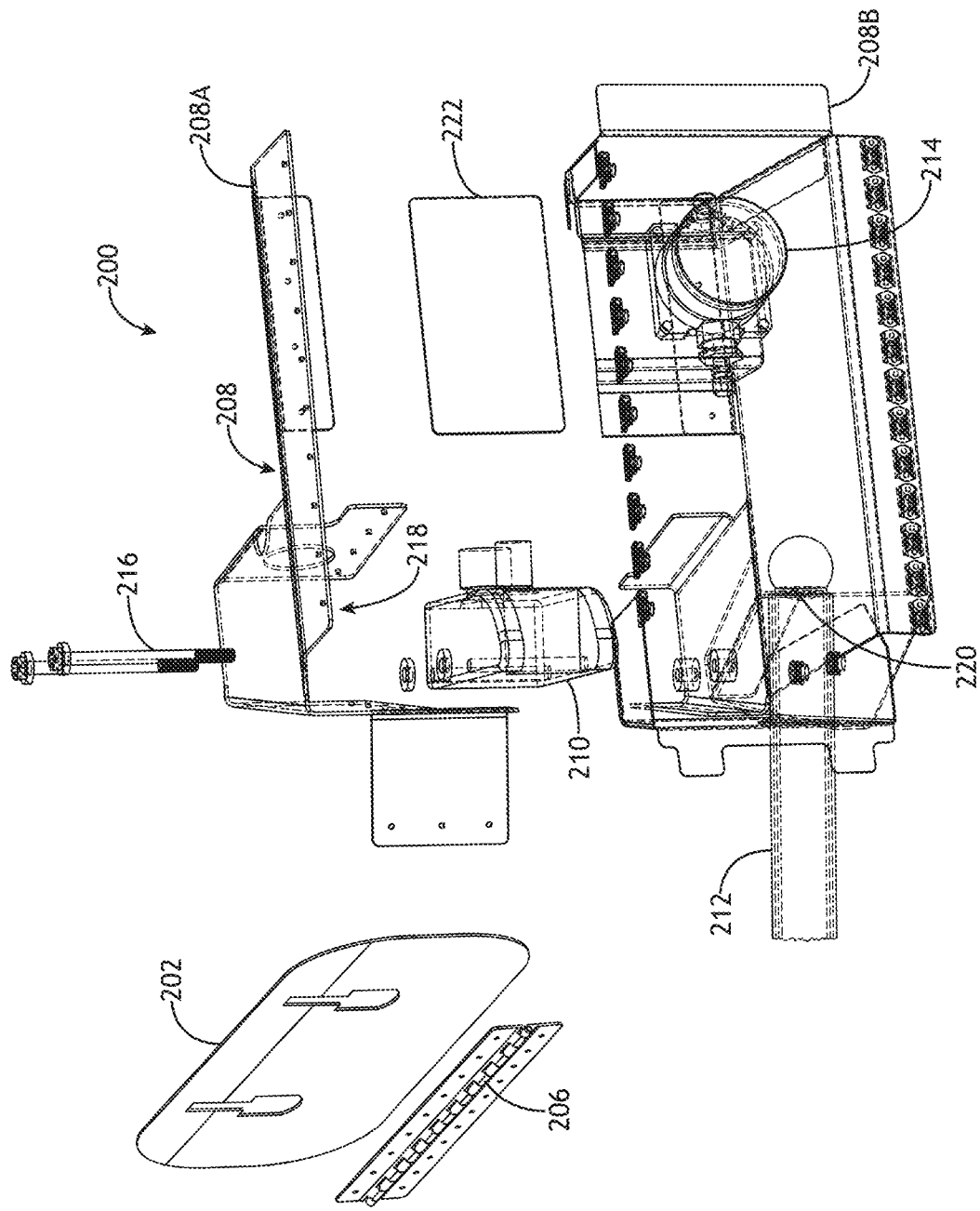
FIG. 7 is an exploded view of the externally accessible APU pump assembly, in accordance with an example embodiment of this disclosure.

FIG. 7 is an exploded view of the APU pump assembly 200, in accordance with an example embodiment of this disclosure. As shown in FIG. 7, the support frame 208 of the APU pump assembly 200 may include an upper support frame member 208A and a lower support frame member 208B secured together by a plurality of fasteners 216. The support frame 208 includes various features that are appropriately shaped or otherwise configured to secure serviceable components of the APU pump assembly 200. For examine, the support frame 208 may include a trapezoidal cavity 218 (or other appropriately shaped cavity) for securing the pump 210 within the externally accessible compartment. In some embodiments, the support frame 208 also includes a circular slot 220 (or other appropriately shaped slot) for securing the removable pump handle 212 within the externally accessible compartment. For example, the pump handle 212 may be withdrawn from the slot 220 and attached to the pump 210 in order to actuate the pump by hand. In embodiments, the pressure gauge 214 may be mounted to an inner panel 222 vertically positioned within the externally accessible compartment. For example, the inner panel 222 may be part of the support frame 208 or it can be held in between the upper and lower frame members 208A and 208B of the support frame 208.

FIGS. 9 and 10 illustrate the rear portion of the aircraft 100 where the APU pump assembly 200 is installed (FIG. 9) and an interior portion of the aircraft 100 immediately behind and above the main cabin where the accumulator 108 is located (FIG. 10), wherein pump 210 and the pressure gauge 214 are both fluidically coupled to the accumulator 108 by tubing (hoses/pipes 106A-106C).

Figure 12:
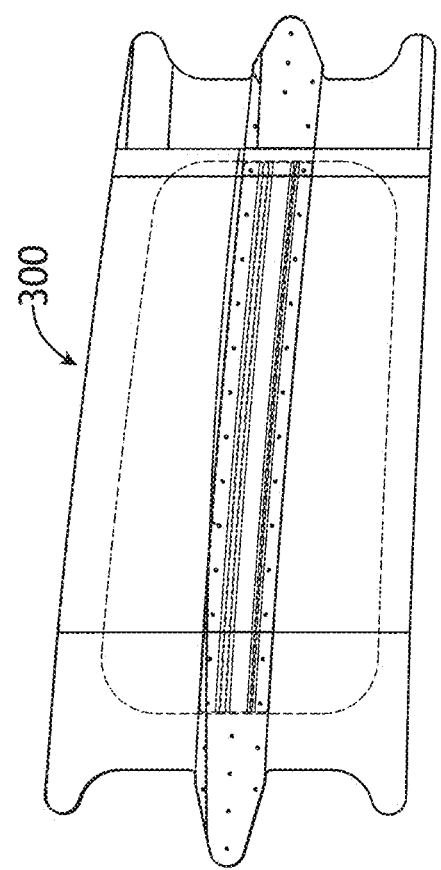
FIG. 12 is a perspective view of the removable external panel, in accordance with an example embodiment of this disclosure.
Figure 11:
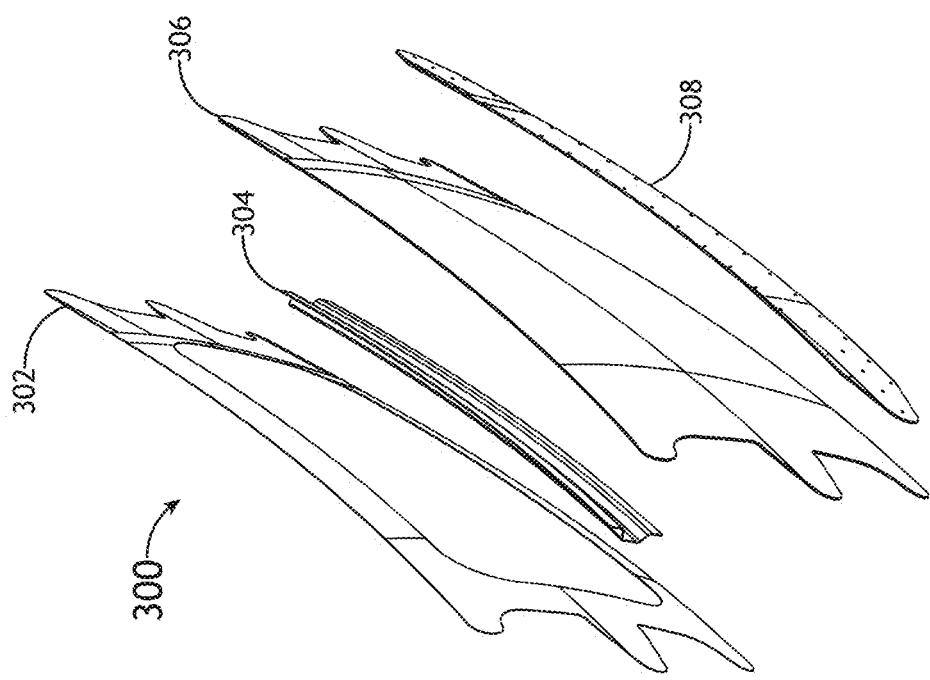
FIG. 11 is an exploded view of a removable external panel for accessing the internal portion of the aircraft illustrated in FIG. 10, in accordance with an example embodiment of this disclosure.

As shown in FIGS. 1 and 3, a system for externally providing pneumatic/hydraulic pressure for the APU of the aircraft 100, including the APU assembly 200, ESU assembly 400, and associated components, may further include a removable access panel assembly 300 configured to cover an opening in the outer wall of the aircraft 100 between externally accessible compartment defined by APU assembly 200 and the main cabin. This opening provides access to the tubing (hoses/pipes 106A-106C) that extends from the pump 210 and pressure gauge 214 to the accumulator 108 and other structures in FIG. 10, such as the accumulator 108 itself. As shown in FIGS. 11 and 12, the removable access panel assembly 300 may include a removable access panel 306 and a seal 302 that defines the opening in the outer wall of the aircraft 100, wherein the seal 302 is located between the outer wall and the removable access panel 306. In some embodiments, a stringer 304 is coupled to an inner surface of the removable access panel 306 and a doubler 308 is coupled to an outer surface of the removable access panel 306 to reinforce the removable access panel 306 and provide an interface for fastening the removable access panel 306 to the outer wall of the aircraft 100.

Although the technology has been described with reference to the embodiments illustrated in the attached drawing figures, equivalents may be employed, and substitutions may be made herein without departing from the scope of the technology as recited in the claims. Components illustrated and described herein are examples of devices and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A system for externally providing pneumatic/hydraulic pressure for an auxiliary power unit (APU) of an aircraft, comprising:
    a pump configured to pressurize an accumulator that is used to start the APU of the aircraft, wherein the accumulator is located within a ceiling of the aircraft and the pump is located within an externally accessible compartment at a rear portion of the aircraft behind a main cabin of the aircraft;
    a removable pump handle used to actuate the pump;
    a pressure gauge for the accumulator; and
    a support frame mounted within an outer wall of the aircraft at the rear portion of the aircraft behind the main cabin, wherein the support frame defines the externally accessible compartment and secures the pump, the removable pump handle, and the pressure gauge within the externally accessible compartment.

2. The system of claim 1, wherein the pump and pressure gauge are fluidically coupled to the accumulator by tubing that extends from the rear portion to the ceiling of the aircraft.

3. The system of claim 2, further comprising:
    a removable access panel configured to cover an opening in the outer wall of the aircraft between externally accessible compartment and the main cabin, wherein the opening in the outer wall of the aircraft provides access to the tubing that extends from the pump and pressure gauge to the accumulator.

4. The system of claim 3, further comprising a seal that defines the opening in the outer wall of the aircraft, wherein the seal is located between the outer wall and the removable access panel.

5. The system of claim 4, wherein a stringer is coupled to an inner surface of the removable access panel and a doubler is coupled to an outer surface of the removable access panel to reinforce the removable access panel and provide an interface for fastening the removable access panel to the outer wall of the aircraft.

6. The system of claim 1, wherein the support frame includes an upper support frame member and a lower support frame member secured together by a plurality of fasteners.

7. The system of claim 1, wherein the support frame includes a trapezoidal cavity for securing the pump within the externally accessible compartment.

8. The system of claim 1, wherein the support frame includes a circular slot for securing the removable pump handle within the externally accessible compartment.

9. The system of claim 1, wherein the pressure gauge is mounted to an inner panel vertically positioned within the externally accessible compartment.

10. The system of claim 1, wherein the support frame is mounted between at least two horizontal or vertical beams of the outer wall of the aircraft.

11. The system of claim 1, further comprising:
a cover panel for the externally accessible compartment.

12. The system of claim 11, wherein the cover panel is coupled to the outer wall of the aircraft by one or more hinges.

13. The system of claim 11, wherein the cover panel is configured to be placed over the externally accessible compartment and secured in closed position by one or more latches.

14. The system of claim 1, further comprising:
an electronic sequence unit (ESU) located within the aircraft adjacent to the support frame that defines the externally accessible compartment.

15. The system of claim 14, wherein the ESU is mounted to a bracket between at least two horizontal or vertical beams of the outer wall of the aircraft.

16. The system of claim 15, wherein the bracket includes a vertical panel coupled to the ESU, a horizontal panel coupled to the at least two horizontal or vertical beams of the outer wall of the aircraft, and a supportive wedge coupled between the vertical panel and the horizontal panel.

17. An externally accessible auxiliary power unit (APU) pump assembly, comprising:
a pump configured to pressurize an accumulator that is used to start an APU of an aircraft;
a pressure gauge for the accumulator; and
a support frame configured to be mounted within an outer wall of the aircraft, wherein the support frame defines an externally accessible compartment and secures the pump and the pressure gauge within the externally accessible compartment.

18. The externally accessible APU pump assembly of claim 17, wherein the support frame includes a trapezoidal cavity for securing the pump within the externally accessible compartment, and wherein the pressure gauge is mounted to an inner panel vertically positioned within the externally accessible compartment.

19. The externally accessible APU pump assembly of claim 17, further comprising:
a removable pump handle used to actuate the pump, wherein the support frame further includes a circular slot for securing the removable pump handle within the externally accessible compartment.

20. A system for externally providing pneumatic/hydraulic pressure for an auxiliary power unit (APU) of an aircraft, comprising:
a pump configured to pressurize an accumulator that is used to start the APU of the aircraft, wherein the accumulator is located within a ceiling of the aircraft and the pump is located within an externally accessible compartment at a rear portion of the aircraft behind a main cabin of the aircraft;
a pressure gauge for the accumulator; and
a support frame mounted within an outer wall of the aircraft at the rear portion of the aircraft behind the main cabin, wherein the support frame defines the externally accessible compartment and secures the pump and the pressure gauge within the externally accessible compartment.

* * * * *